RECORD CONTROLLED PRINTING OR WRITING MACHINES

Filed May 22, 1956 4 Sheets-Sheet 1

INVENTOR.
WILLIAM J. HILDEBRANDT

BY Jesse A. Holton

ATTORNEY

Dec. 23, 1958 W. J. HILDEBRANDT 2,865,487

RECORD CONTROLLED PRINTING OR WRITING MACHINES

Filed May 22, 1956 4 Sheets-Sheet 2

INVENTOR.
WILLIAM J. HILDEBRANDT

BY Jesse A. Holton

ATTORNEY

Dec. 23, 1958 W. J. HILDEBRANDT 2,865,487

RECORD CONTROLLED PRINTING OR WRITING MACHINES

Filed May 22, 1956 4 Sheets-Sheet 3

INVENTOR.
WILLIAM J. HILDEBRANDT

BY Jesse A. Holton

ATTORNEY

INVENTOR.
WILLIAM J. HILDEBRANDT
BY Jesse A. Holton
ATTORNEY

United States Patent Office 2,865,487

Patented Dec. 23, 1958

2,865,487

RECORD CONTROLLED PRINTING OR WRITING MACHINES

William J. Hildebrandt, Farmington, Conn., assignor to Underwood Corporation, New York, N. Y., a corporation of Delaware Application May 22, 1956, Serial No. 586,602

7 Claims. (Cl. 197—20)

This invention relates to automatically operated machines for producing printed or typewritten matter, for example, a typewriter or printing calculator which is controlled or operated in its action according to instructions or control signals on a record like a punched paper tape or strip, of the type long known and used in automatic telegraphy. For greater usefulness, such printing or writing machines should be capable of operation manually, by actuation of their keys and other controls in the usual way; but for automatic operation the keys and controls are also actuated by solenoids or similar devices added to the machines, with the solenoid devices in turn energized from a controlling record such as the punched tape mentioned.

Devices for sensing or "reading" punched paper tape or similar records are well known, and these usually operate in steps, first reading a coded punching or other representation of information, then stepping to another representation, and then repeating the reading and stepping operations in cycles indefinitely or until the reader is stopped at some stage or step.

It is also known to govern the operation of a solenoid actuated typewriter or similar printing machine from a control record such as a punched paper tape, through a reader device for sensing the control record. Both the reader and the typewriter of course have limits of individual operating speed because of the particular mechanisms involved, and some arrangement is preferred to prevent operation of the reader at a speed any greater than the typewriter can function in response to signals read from the control record. On the other hand, the rate of operation of the reader should not be so slow that the typewriter is idle for any appreciable period while the reader could be supplying useful controlling signals.

An object of this invention is therefore to provide, in the combination of a writing machine controlled by a reader, an arrangement whereby the speed of operation or recycling of the reader from step to step is governed by the speed of operation of the writer in response to each preceding signal from the reader. Not only this, but a reader-writer combination of this invention will include provision for operating the reader at its top speed from step to step whenever there is a signal sensed by the reader which can not be used by the writer. This speed-up of the reader when the writer is not operating will reduce idle time of the writer and therefore speed up the overall rate of operation of the apparatus. Furthermore, the writer-control of the reader speed is preferably timed so that reader operation and writer operation may overlap in large part, as long as there is no false operation of the two devices or skipping of information to be transferred from reader to writer.

Further objects of the present invention are to design equipment of the character described, using known machines, devices or components as far as possible, modifying them only where necessary and connecting or combining them properly to produce the desired results.

In carrying out the objects of this invention, in one embodiment thereof, the keyboard and functional controls of an electric typewriter of known design are provided with electromagnets or solenoids which may selectively be energized electrically to operate the individual keys and various controls. The solenoids are connected to a source of power through the contacts of a translating or decoding unit, and the decoding unit contacts are in turn actuated in various code combinations from a sensing device or reader of known design, which is capable of sensing or reading combinations of holes previously punched in a paper record tape. The reader is chosen to have a higher cycle to cycle continuous operating rate than the fastest typewriter keying interval. The invention provides for halting each recycling operation of the reader until a "start" signal is received from the writer, and in sending the "start" signal from the writer only after sufficient time has passed to insure completion of the previous typewriter operation before another reader-sensed typewriter action is started. This may be done by delays built into the controls and by means of a universal or feed-back switch on the typewriter, which may be of the character disclosed in some detail in the copending patent application Serial No. 539,724, "Typewriter Control Means," filed October 11, 1955 by A. H. Sharpe et al., and assigned to the same assignee as the present invention. In addition to this, a further reader cycling control is arranged to bypass the typewriter-operated universal switch and allow the reader to continue cycling at its normal top speed whenever the signal from the reader is such that it will result in no typewriter action. As soon as the reader senses a signal which can be used to activate the typewriter, the controls are restored to dominance by the normal delays and the universal switch, providing self-timing of the typewriter action and the following reader cycle or cycles.

Other objects, and further details of that which is believed to be novel and included in this invention will be clear from the following description and claims, taken with the accompanying drawings in which are illustrated diagrammatically examples of two record-controlled writing machines embodying the present invention, each incorporating the writer-timed reader with the reader cycling control for cutting out the writer timing when there is no writer action.

*The general scheme*

Figure 1:
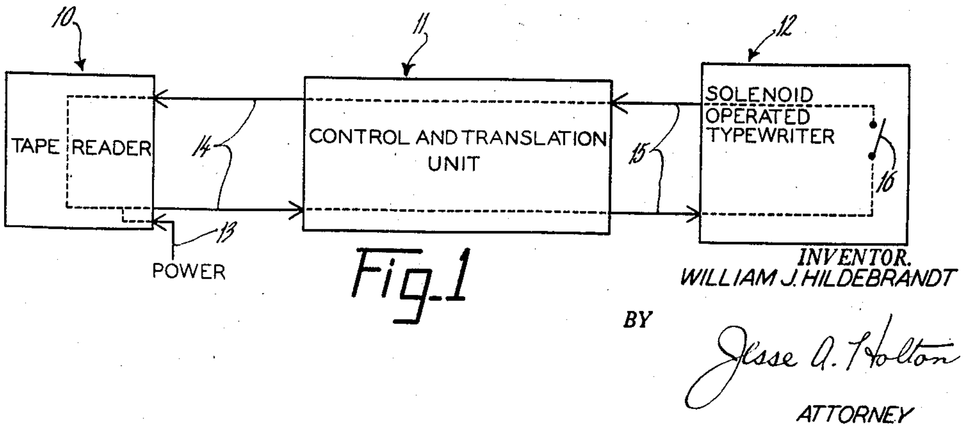
Figure 1 is a block diagram showing the relation and interconnection of the principal elements of a device according to this invention, including a tape reader, a control and translation unit, and a solenoid operated typewriter.

The exemplary arrangement includes three basic devices or units which will be described later under separate headings. These units, as shown in Figure 1 are, a tape reader 10, a control and translation unit 11, and a solenoid operated typewriter 12. An electrical power supply 13 leads to the reader, and through connecting power and signal lines 14 between the reader and control unit and similar lines 15 between the control unit and the typewriter actuators or solenoids, all these devices may be supplied with suitable control power. If desired, and assuming that the typewriter is of the electrically driven type, a separate source of driving power may be used as is customary for the typewriter actions. A momentary contact start switch 16, located on the typewriter, may be used in the control power circuit as later described.

Various relays, switches and other devices will be referred to in this specification and the drawings, and an alphabetic numbering system will be used—each relay for example carrying a letter referring to its coil or winding and the same letter referring to the contact or contacts controlled by the same relay coil, with numbers added to the letters to identify particular contacts or switching points. Although various parts of a single relay may be physically located remote from each other in the drawings, for simplifying the diagrams, the true functional relationship of these parts will be indicated by the common alphabetic designations used.

In order to avoid confusion in this specification between reference characters and the characters involved in printing operations of the writer, the typewriter characters will in each case be enclosed by parentheses, (thus).

All devices, circuits, contacts, etc. in the various diagrams are indicated in their normal, at rest, or deenergized positions.

*The tape and tape reader*

The record used to operate the typewriter may be of any form, but a paper tape bearing a series of 5-position coded punched holes according to the well known Baudot code system or some variation thereof has advantages over other types. Therefore, the present invention will be described as using a tape with coded transversely positioned punched holes, plain or chadless, in a modified Baudot code arrangement. The usual regularly spaced feed holes may also be provided in the tape, for ease in driving and positioning the transverse rows of code holes in the tape reader.

The 5-position code allows for thirty-one combinations of one or more punchings in the system, and an added designation when no holes are punched, to produce a total of thirty-two distinguishable representations. The Baudot code uses twenty-six of these representations to signify letters of the alphabet when the system is normal, or when such codes follow a "Letters" shift code (punched holes 1, 2, 3, 4 and 5) on the record. When the same twenty-six representations follow a "Figures" shift code (punched holes 1, 2, 4 and 5), then these will signify the numerical digits from 0 to 9, punctuation marks, special symbols, and various signals for operation of machines using the tape. The remaining three combinations of punched holes may be used, with or without the "Shift" designations, as further signals for machine operation. The "no hole" representation is used when it is desired to feed the tape through a machine without transmitting any particular information.

The record reader may be one of any known design, as long as it meets the operating requirements by producing signals to the control unit, when called for, for use by the writer. A standard punched tape reader found useful in the invention includes a driving motor which runs at a constant speed, and a magnetically actuated clutch which is used to connect the motor to a driving shaft when desired. The driving shaft carries switch operating cams S1, S2, S3, S4 and S5 for control purposes as will be later explained, and rotation of the shaft also allows five hole sensing pins (not shown) to operate, controlling reader switches RS1, RS2, RS3, RS4, and RS5, see Figure 3, in a manner well understood in the art. Each of these switches is normally open, when a tape punching is not opposite its corresponding sensing pin, or when the reader is in non-sensing portions of its cycle. Movement of a sensing pin through a punched hole during a cycle of the reader results in closing of its corresponding reader switch RS.

Although the driving motor for the reader is running constantly, the tape is not fed through the reader and the holes in the tape are not sensed unless and until a starting magnet is energized. In the drawings, SM indicates the coil of this magnet, which, when momentarily energized, allows the driving clutch to engage the driving shaft of the reader for a single revolution, or cycle. If the magnet SM is not still energized or reenergized just before completion of the single clutch revolution, the clutch will disengage and stop the reader driving shaft at the end of that single revolution, or cycle. Each revolution of the driving shaft will step or feed the tape between one coded set of hole punchings and the next one.

If the magnet SM is kept energized or is reenergized just before completion of a cycle, the shaft will continue to be clutched to the driving motor and will rotate with the motor at the motor driving speed until magnet SM is deenergized before the completion of some following cycle.

One reader found satisfactory for use with a particular typewriter in the present invention will cycle at a continuous rate of 20 revolutions per second, that is, with the start magnet SM always energized. However, this is not meant to limit the invention because higher or lower cycling rates may be available in other readers, and faster or slower operating typewriters than the one selected may be used.

*The solenoid operated typewriter*

A typewriter used as the printing or writing mechanism in this invention will have all of its usual keys and other manually operable controls. Preferably this machine will be powered electrically, although a standard manual keyboard machine could be adapted for the purpose. Whatever the mechanism used, each key, and each lever or similar control which it is desired to actuate from the control record will be supplied with an electromagnet or solenoid, which will operate the key or other control device when energized. The solenoids for this purpose are marked KB.

The exemplary typewriter also carries the universal switch US, which is operated by a portion of the typewriter action each time that a key is depressed or a control device is actuated, and this switch, when standing restored, is capable to feed a signal to the reader to initiate another reader cycle at the proper time. For an example of preferred construction and operation of the universal switch, see the patent application Serial No. 539,724, above mentioned.

The start switch 16, a stop switch 17, and a single character read switch SCR with contacts 18 and 19, are also located on the typewriter in a place readily accessible to the typewriter operator. Their functions and operation will be clarified later. The start and stop switches are momentary contact devices, and will return to their normal positions shown, when not held by hand. The SCR switch is a toggle switch, and it will remain in the condition in which it was last placed. In its operated position, it will create circuit conditions, so that each single operation of the start switch 16 then will cause a single reading cycle.

When a case-shifting action is embodied in the typewriter, a solenoid CS (see Figure 2) is used to actuate the case shift mechanism under proper conditions. This solenoid also operates relay contact CS20 when the CS coil is energized, to move this contact to an abnormal or "upper" case position. When coil CS is not energized, contact CS20 is in normal case or "lower" case position.

Obviously, if the machine does not have a case shift action (see Figure 4) the CS solenoid, coil, and contact are not required. The machine diagrammed in Figure 4 has but a simple alphabetic type font, a minimum of punctuation symbols, and no numerals. Each usable type face is on a single type bar, actuated from a single key. No case shift action is involved. Such machines may be used for poster printing, or for writing readily legible records for prompting purposes. The type sizes in such writers are large and a limited font is ample for the desired results.

Figure 4:
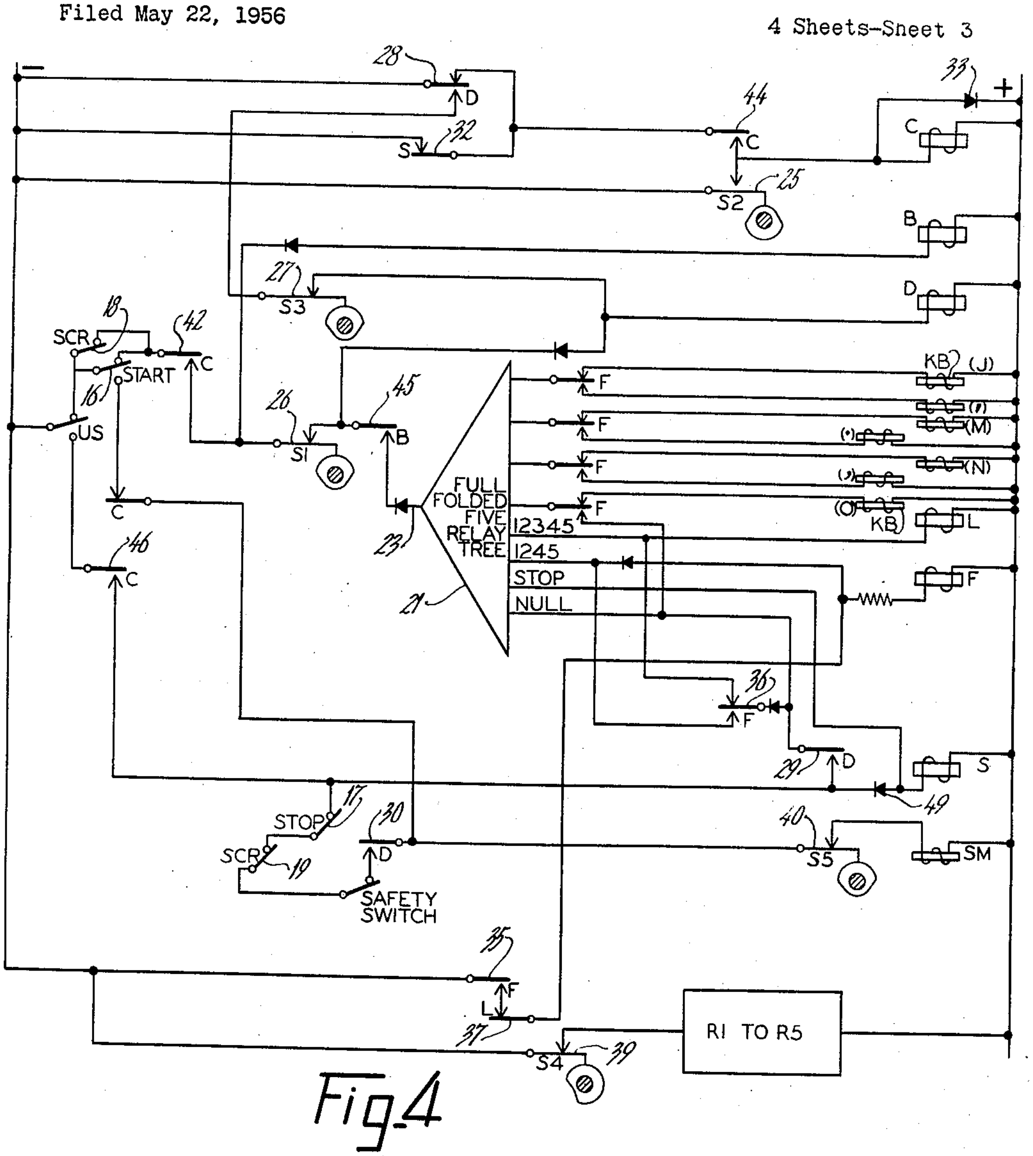
Figure 4 is a diagram similar to Figure 2 showing important components of a modified combination of a reader, control unit and another typewriter, but with this writer having considerably less than a full keyboard.

A diagram similar to that of Figure 4 would also typify a machine having a strictly numerical keyboard, because no "case" shift would be involved.

In any case, using the five-hole code, there are always code combinations which will not be used to actuate type bars or similar elements for printing characters. Even in a full keyboard machine, there is always the combination of five unpunched positions which will not actuate any part of the typewriter. In less than full keyboard machines there will be the possibility of several other code combinations which will have no significance to action of the writer. The present invention provides the speedy passing of code combinations through the reader if they have no meaning to the particular writer being used, and provides proper timing for the reader to act only after an instituted operation of the reader has been completed. All codes which are not representative of operations of the writing machine that is to be controlled, and thus have no use therefor, are called "null" codes for that machine, although they may have significance when used to control other machines.

*The control and translation unit*

Figure 3:
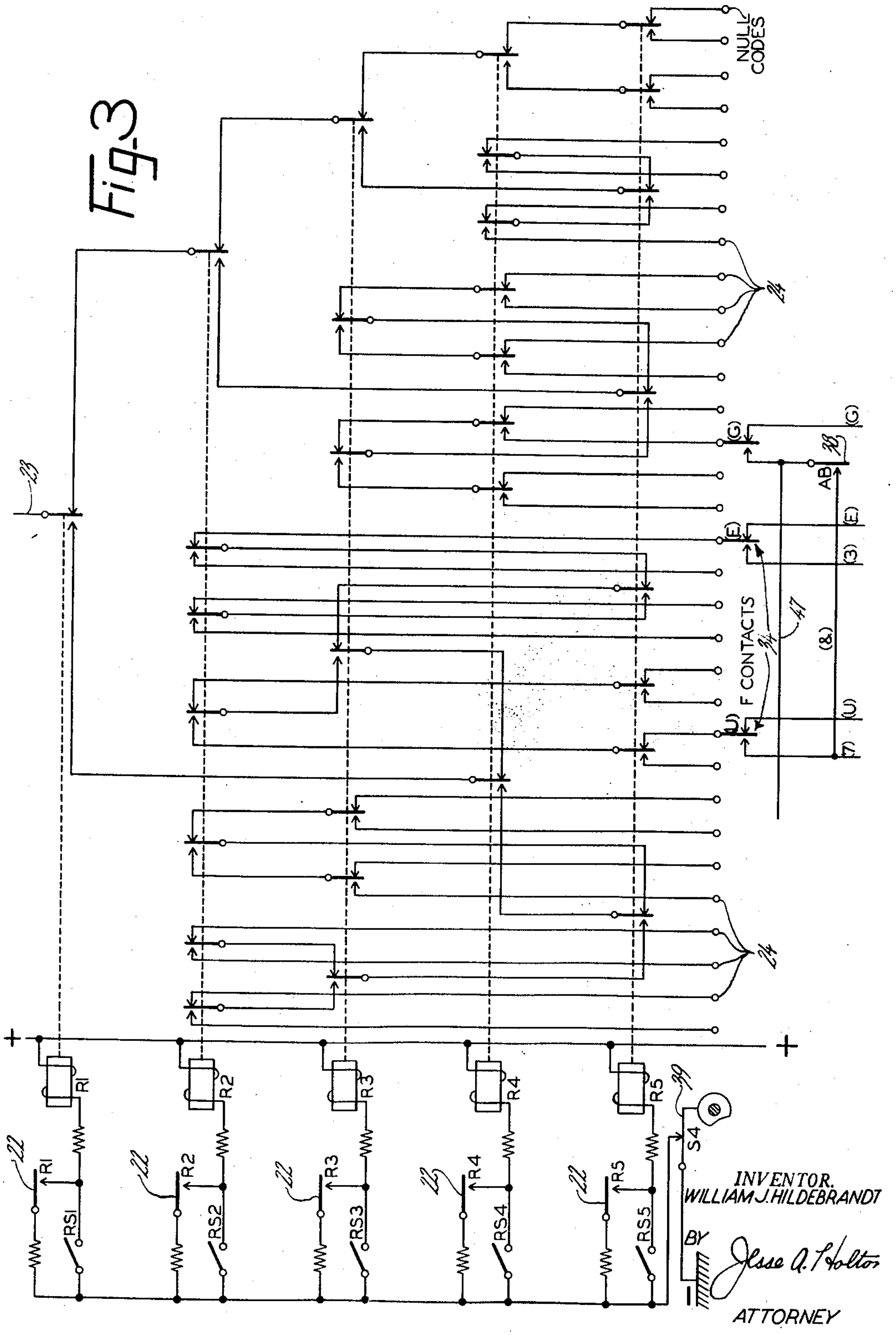
Figure 3 is detailed electrical wiring diagram of the translation portion of the control unit of Figure 2.

This unit, housed in or on a convenient chassis, receives signals from the reader switches RS1 to RS5, to close circuits through the coils of reader relays R1, R2, R3, R4 and R5 (Figure 3). As indicated by the dotted lines extending from the armatures of these relays, each R relay operates to move a contact or contacts between one position and another in a translation network or tree 21. The arrangement shown is of the full folded type, using the five relays indicated. Each reader relay R also carries a corresponding holding-in contact 22 in its coil circuit, used as later explained.

The tree is of a conventional design, with a single input 23, and many outputs 24, each of which leads either directly, or through other relay contacts, to a keyboard solenoid KB, to other writer controlling or reader controlling solenoid coils, or to a "null" code line. This is where reader actuation is translated into writer action.

Figure 2:
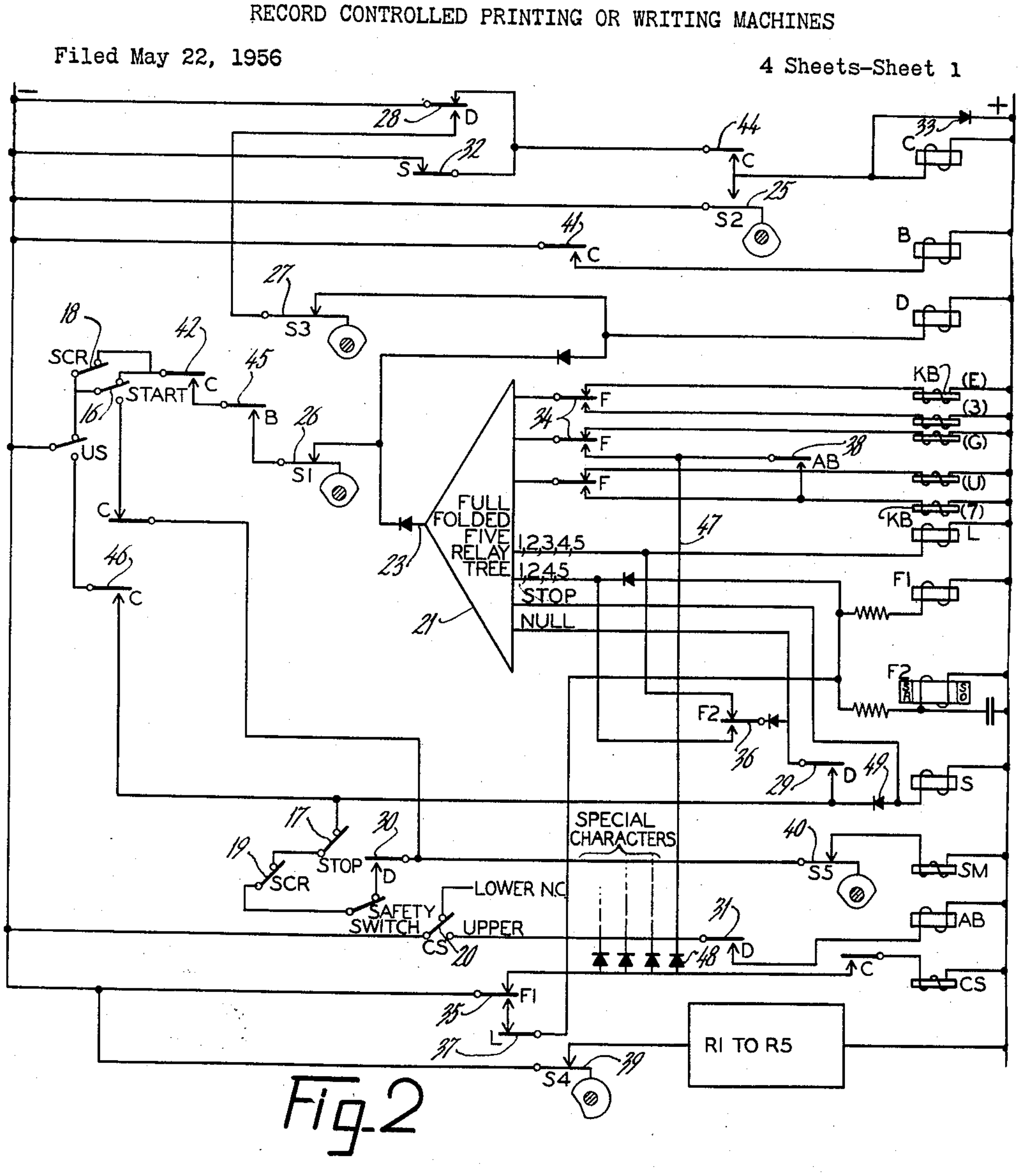
Figure 2 is a logical wiring diagram showing the important components of a combination of a tape reader, control unit and a full keyboard typewriter, but with the translation portion of the control unit assembly shown only in general symbolic form.

The tree, the reader relays R1 to R5, and all the other control relays about to be described are mounted in the control unit 11, and are connected to each other and to the reader and writer units as shown generally in Figures 2 and 4.

The main control relay C governs the action of most of the other relays generally, having contacts in the coil circuits of the B relay, the D relay, the S relay, the SM relay, and the CS relay, when used. Its coil circuit is energized through a switch contact 25 actuated by the S2 cam of the reader at 15 ms. after start of the reader cycle. In one device built according to this invention, the C relay is of a type having an operating time of 10 ms. and release time of 5 ms.

The B relay is a timing relay with a delayed operation but relatively fast release, compared to the C relay. One satisfactory timing has been found to be greater than 60 ms. operating time and less than 10 ms. release time. The B relay coil is energized through a C relay contact, and its contact in turn controls the input to the tree. If added time for operation of the writer is needed, between one and a succeeding action of the writer, the desired timing may be readily obtained by using a B relay of proper delayed operation characteristics. For example, where the type size is large and a relatively long time is required for the larger carriage spacing steps between characters, the B relay is selected to meet the requirements of that particular type of writing machine, such as indicated in Figure 4.

Figures 5, 6, 7:
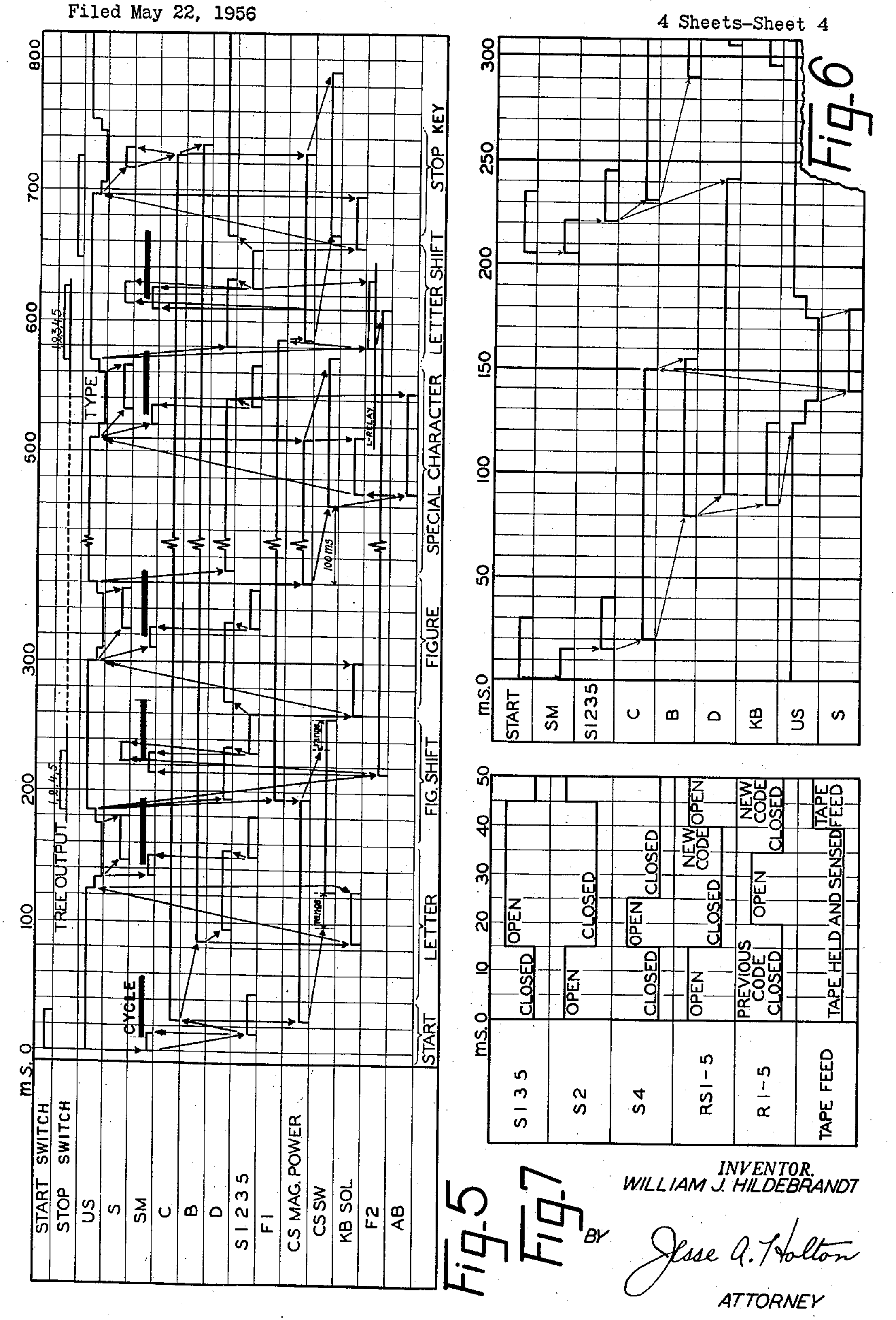
Figure 5 is a timing chart indicating the periods of operation of various elements of devices in the reader, control unit, and typewriter combination of this invention shown in Figure 2, plotted against different kinds of reader sensed signals and corresponding typewriter operations or functions.
Figure 6 is a timing chart similar to Figure 5 indicating operating periods for various elements in the combination when the controls are set to read and type a single character at a time.
Figure 7 is a timing chart indicating the operation of certain reader-operated switches and tape driving and sensing mechanisms during a single cycle of a tape reader useful in this invention.

The D relay has a combined control function, being operated initially through the B relay, following operation of the C relay. Like the C relay, and all others unless otherwise described, it has a normal operating time of 10 ms. and a release time of 5 ms. in the example shown. While the S1 cam switch contact 26 and the S3 cam switch contact 27 in the reader are closed, at rest or beginning of a reader cycle, and assuming that the C and B relays are first operated, then the D relay coil is energized every time that the universal switch US closes to its upper position near the end of a typewriter action. The D coil is deenergized by opening of the S1 and S3 cam contacts 26 and 27 at 15 ms. after start of a reader cycle, as seen in the chart of Figure 7. Ten ms. later, the D relay operates its contacts, 28 in its own coil circuit through the S3 cam contact 27, and 29 in the circuit of the S relay coil from the "null" code output of the tree. Another D contact 30 is in the coil circuit of the reader start magnet SM.

When case shift action is involved in the writing machine, another D contact, 31, is in the circuit of relay coil AB (Figure 2).

The reader stop signal comes through operation of the relay S, the coil of which is energized variously, from the "Stop" code output of the tree, from the universal switch US when the C relay is operated, and from the "null" code output of the tree when the D relay is operated. As is evident from the diagram of Figure 5, the relay S has a slower operating time than the relay SM. This permits institution of a cycle by the SM magnet before the S relay will operate. This means that whenever an operation of the reader stop magnet S accompanies an operation of the reader start magnet SM, the reader stop magnet will ineffectually function. An S relay contact 32, controlled by the stop relay S, is in the C relay coil holding circuit, and its opening would open the C relay coil to release it in the normal 5 ms. for this relay, excepting that a time delaying rectifier 33 is placed in parallel with the C relay coil circuit to delay C relay release and to maintain it active for sufficient time to permit complete writer operation on the character last sensed by the reader, at which time the S switch 32 is again closed, wherefore the C relay is not dropped, as is evident from the diagram of Figure 5. This has the effect that the C switch 42 and the B switch 45, both in the input power line to the translating tree 21, remain closed.

In order to condition the tree outputs 24 to operate the proper keyboard solenoids KB, depending upon whether the control record reader has last sensed a "Figures" or a "Letters" shift signal in the five-position code, a figures shift relay F and a letters shift relay L are used in the control unit.

The F relay may be, and in practice is, an array of several relays, but in Figure 2 it is shown as a single relay F1 with an operating time of 10 ms. and a release time of 5 ms. and a single slow operate, slow release relay F2 with an operating time of more than 30 ms. and a release time of more than 30 ms. In Figure 4, this relay array is simply given the designation F, because the extra delay for case shift action is not needed or used in the machine of that figure.

The coils of the F relays are energized primarily from that output of the tree corresponding to operation of code relays R1, R2, R4 and R5, which means that the reader has sensed holes in the 1, 2, 4 and 5 positions and has operated reader switches RS1, 2, 4 and 5. The F relay controls transfer contacts 34 on the outputs 24 of the tree, and has a holding-in contact 35 in its own coil circuit. Another F relay contact (F2 in Figure 2), marked 36, transfers the stop relay S coil circuit from control by the letters code (1, 2, 3, 4, 5) output of the tree to control by the figures code (1, 2, 4, 5) output of the tree after each operation of the F relay.

The letters shift or L relay has its coil energized from the tree output corresponding to operation of all five code relays, R. Operation of the L relay breaks the F relay holding-in circuit at L contact 37, to release the F relay or relays.

The relays F1 and L constitute a state conditioning means for the switches 34, namely they control these switches, on the one hand to stand in the position seen in Figure 2 after each operation of the relay L, and on the other hand to stand operated after each operation of the relay F1.

When a case-shift action is included in the writing machine, the CS relay contact 20 is used to operate a case-shift transfer relay AB at the proper time. The AB relay has contacts 38 in various tree outputs 24 beyond the F relay transfer contacts 34, and in the KB solenoid lines which may be energized while the figures shift relay F is operated. The function of this relay will be clear from the description of machine operation which follows in the next section of this specification.

In the drawings, various rectifiers, resistances and similar elements are indicated by conventional symbols, but these are not always referred to in this description because they merely perform recognized functions in the D. C. circuits to improve the action, to prevent sneak paths or back tracking, to reduce switch contact arcing, and so forth. Such devices may of course be added or eliminated as desired, and many actually used have been left out of the diagrams, to clarify the general scheme.

*Operation*

*Start, and letters.*—Assume that all relays, solenoids and other devices are at rest, as shown in the drawings, and it is desired to start operation of the writer under control of the reader. Assume also that the first code designation in the punched tape is a letter, which is the normal case when no shift designation has been punched. For example, assume that the code for the letter (E) appears on the tape, which is a punching in the signal code hole position 1. The reader driving rotor is preparatorily started by closing a switch (not shown). To start the machine, the start switch contact 16 is pressed, transferring this contact from its upper position to its lower position and completing a circuit through the coil of the reader starting magnet SM thereby starting the reader through a cycle of operation. By reference to the charts of Figures 5 and 7 it will be seen that as the reader starts to cycle, cam switches S1, 2, 3, 4, and 5 all operate at 15 ms. after start. S1 contact 26 opens the input 23 to the tree. S2 contact 25 closes the coil circuit to relay C. S3 contact 27 opens to insure the D relay will not operate the proper time. S4 contact 39 opens the coil circuits to reader relays R1 through R5 to wipe out any previous setting of these relays. S5 contact 40 opens to cut off power to the reader start magnet coil SM after its operation, if the start switch contact 16 is held beyond that time in its downward position.

When the C relay operates, it closes its contact 41 (Figure 2) in the B relay coil circuit, and the B relay operates after its characteristic delay period. The C relay also closes its contact 42 in the tree input circuit, readying this line for a signal. Contact 42, in the arrangement shown in Figure 4, also functions to complete the B coil circuit following operation of the C relay, instead of the contact 41 of the other form.

The C relay will hold its operated condition as long as either the S relay contact 32 is not operated and the D relay contact 28 is not operated, a self holding C contact 44 serving this purpose in the C coil circuit.

At 25 ms. after start of the reader cycle, the S4 cam contact 39 is again closed, and, with the assumed code for the letter E in reading position, namely the #1 code hole punching in reading position, the RS1 reader switch closes at 15 ms. of the reader cycle, and power will flow to operate reader relay R1. Its related tree contact is thus operated, setting up a translation circuit leading to the (E) output 24.

At 40 ms., RS1 will again be opened by action of the reader, but relay R1 will be held in by its holding contact 22, maintaining the tree setting until a subsequent reader cycle.

At 45 ms. the S1, 3 and 5 contacts are returned to their original closed positions by the cams, and the S2 contact is again opened.

When the B relay operates in delayed fashion from the C relay, it closes B contact 45, leading to the tree, so that power is applied through the tree to the proper keyboard solenoid KB, operating the typewriter. Operation of the B relay also energizes the coil of D relay in the form shown in Figure 2. With the slightly different arrangement of Figure 4, the D relay is operated on the return movement of S1 cam switch contact 26, after C relay contact 42 is closed.

Typing will now take place, and the US switch will first move downward, breaking the tree circuit, and making a circuit which leads jointly to the Stop relay S and to the reader start magnet SM through operated C relay contact 46. The C relay will remain in operated condition because of the delay provided by rectifier 33, even through its coil circuit might momentarily be broken by opening of both S contact 32 and D contact 28.

At this point the reader will have started another cycle because the magnet SM has been energized. In this cycle the record tape is moved to the next reading position, but the next reading operation in this position will be delayed until the US switch returns at the conclusion of the executed typing operation. D relay is still operated, and is self-held by its contact 28 until cam switch S3 opens contact 27 again in the new cycle.

*Figure shift.*—Assume the next punching in the tape is the code for the figures shift signal, holes 1, 2, 4 and 5. Because the tape is fed through the reader near the end of the previous cycle after retraction of the sensing pins and opening of the RS contacts, no interference is caused with the action of the typewriter taking place at about that time.

When the US switch starts to return to its upper position it breaks the S coil circuit and opens the contact 28 related to the C relay, but at the end of the cycle, the contact 32 for the relay C is closed again so that, with the aid of the time delay 33, the relays C and B remain actuated.

Reader cycling will sense the figures shift code before the typing operation is completed so that relays R1, 2, 4, and 5 will operate. At the end of the execution of the typing operation, when the US switch restores, power is supplied to the appropriate tree contacts to produce an output leading to the F relay coils, F1 and F2. F1 relay contact 35 in the coil circuit of the CS solenoid releases this solenoid, and release of the CS contact 20 releases the AB relay and opens its contacts 38. The F relays will remain energized through the transferred F1 contact 35 and the unoperated L contact 37 until at some future time, under control of a letters shift code a signal opens the L contact.

Cam switches and other elements cycle as before but without any functional delay imposed thereto by an operation of a KB solenoid and consequent operation of the switch US. Consequential to the operation of the F2 relay, as clearly evident from Figure 2, the start magnet SM is operated, instituting a cycle, at the end of which the next code on the record tape is in position for sensing. The circuit for the SM magnet is opened by the cam controlled switches 26 and 40, soon after the start of the cycle.

*Figures.*—Assume that the next code is for the number (7), then the end of the cycle caused by the figures shift code, will result immediately in the setting of the tree by relays R1, R2, and R3, corresponding to the proper code punchings in the tape following the figures shift punching. Because the F relays stand operated already before the start of this cycle, and, on the other hand, the US switch stands unoperated, the output from the tree 21 will be immediate, but instead of being selective for the letter (U), it is transferred by the F contact 34 to the line leading to the KB solenoid for (7). The typewriter will operate to print the desired character and at the conclusion of such operation the US switch will restore to close again the power supply for the S and SM signals to start another reader cycle, the control unit remaining in figures shift condition.

*Special characters.*—These are symbols or marks which appear in upper case in some of the typewriter key actions, for example the ampersand (&) is upper case on the (7) key and type bar. However, the code punching for this character is 2, 4 and 5, the same as that for the letter (G), but following a figure shift code rather than a letter shift code. Assume the proper code punching for (&), following a figure shift punching, is present on the control tape.

As the universal switch US starts to operate in typing the previous character it generates the SM signal to energize the reader starting magnet, and energizes the S relay for a new reader cycle. As the reader cycles, it senses the code punchings 2, 4, and 5 and the R2, R4 and R5 relays set this code up on the tree but pending the restoration of the US switch at the conclusion of the typing operation, the input to the translating tree 21 will be delayed. When after the restoration of the US switch this signal comes from the tree output for this coded combination it will be transferred to the lower line by the F contact 34 (F being previously operated). All special characters are connected from F outputs by a line 47 through a one-way rectifier 48 to the CS coil circuit. The signal on line 47 will operate the CS solenoid, causing the typewriter to case shift to upper case, and closing CS contact 20 to energize the AB relay. AB relay operation closes all the AB contacts 38, and in the example given, applies the tree output to the keyboard solenoid KB for actuating the (7) key. Because the machine is in upper case shift condition, the character (&) will be typed.

Universal switch action during the typing will initiate another cycle of the reader as before.

*Letters shift.*—If the next tape punching includes all five holes, there will be produced a signal for establishing a letters shift condition or state. If the letters shift code on the record tape follows a code representing an operation of the writing machine, then the signal will be delayed pending the conclusion of such operation, that is until the US switch restores. The relays R1 to 5 set the tree so that output comes from the single line representing that combination. This output energizes the L relay coil directly, breaking L contact 37 in the F relay coil circuits, deenergizing the F relays. The F2 contact 36 returns to its upper position by delayed release action of this relay, so that through closed D contact 29, closed stop contact 17, closed SCR contact 19, D contact 30 and S5 contact 40, the SM magnet is operated.

As the cycle instituted by the SM magnet is completed, a new reading operation may start immediately under the control of the next code, because the US switch stands unoperated. Both the letters shift and figures shift codes may be regarded as "null" codes, described below, because they do not involve the typewriting mechanism.

*Null codes.*—When there are no punchings in the tape, or when the tape contains punchings in combinations which are not used to activate elements in the writing machine, all these outputs from the tree are connected to a null line leading directly to the coil circuit of relay S through D contact 29, when D relay is operated. Examination of the circuits in Figures 2 and 4 will show that the reader start magnet SM is adapted to be energized under the control of any null code, but in each instance its energization can only occur if or when the power supply to the translating tree 21 is closed by the US switch. The null signals pass all through the operated D switches 29 and 30 to the start magnet SM. At the end of any cycle in which a null code is translated into a signal over the null line, a new reader cycle of any sort, predetermined by the next code on the record tape is started without delay. This is because there was no KB solenoid operation and no US switch operation produced incident to the SM signal.

*Stop, by code.*—One of the code combinations is selected to signal the reader and typewriter to stop. When, during a reader cycle, this particular code combination is sensed and set up in the tree, the stop code tree output leads directly to the S relay, energizing its coil as soon as power comes through the tree. A rectifier 49 blocks this signal from the reader start magnet SM, so that when the reader completes its cycle it will stop. Because the S relay is operated without an accompanying operation of the start magnet SM, the S contact 32 in the holding circuit for the C relay opens and drops such relay. This causes the C contact 42 and the B contact 45 to open and stop, the input to the tree 21, stopping the reader, but the D relay will remain operated while the reader is at rest.

*Stop, switch operated.*—See Figure 5. The machine may also be stopped at will by the operator, by opening the stop switch 17. Therefore the circuit for the start magnet SM is opened and in turn, by operation of the S contact 32 the C relay will be dropped out. The started cycle continues to the end, but because the C and B contacts stand now open, further inputs to the translating tree 21 are prevented and the SM coil cannot be energized. Therefore there will be no new cycle started. A safety switch or switches may be included in series with the manually operable stop switch, to stop the machine automatically in case of a tape break, jamming, or other malfunctioning of the reader or typewriter. Such arrangements are not detailed here because they are well known. When once the machine has been stopped, by whatever means, it may be started again only by using the start switch in the manner described above.

*Single character read.*—When it is desired to translate information on the tape a single character at a time, the toggle switch SCR is first thrown to its downward position, opening contacts 18 and 19. This assumes that the machine has previously been stopped. The start switch 16 is now moved to break its upper contact and complete the circuit to the reader start magnet SM directly. The reader cycles to set up the tree and C and B relays are operated.

Now, as the start switch is released and contact 16 recloses to its upper position, the tree circuit is completed to operate the proper KB solenoid. When the writer operates, the US switch transfers downwardly to energize the S relay coil. Operation of S opens contact S32, and because D was previously operated from B, the C relay is released. SM is not operated because SCR contact 19 is open and there is no longer a path to its coil, so no new reader cycle is started. See Figure 6 for timing in this operation. The D relay remains operated because S3 contact 27 is closed and remains closed while the reader is at rest.

*Limited keyboard machines*

Figure 4 shows diagrammatically a machine which has no case shift, and therefore uses no CS solenoid or relay, and no AB relay. There are no "special characters" printed by this machine, but the F relay and L relay are used only for code interpretation, to operate the proper keyboard solenoids KB and to condition the controls to bypass the US switch when shift codes are sensed. Proper delay in the B relay is provided so that the typewriter carriage has time to move between one position and the next, allowing the typing of large characters at wide spacings.

From the above, it will be seen that provision is made for timing operation of the reader according to times required for typewriter operation. When no typewriter operation is required, the reader skips rapidly to the next typewriter actuating code. A full keyboard typewriter found useful here has a safe operating speed of about 11 characters per second, and the basic timing is based on this. The limited keyboard machine may have a top speed considerably lower than this, especially when added carriage spacing is involved. Limited keyboard machines with standard 10 to 12 pitch character spacings will not require the same delay arrangement necessary with machines using the large type.

As will be evident from the foregoing description, certain aspects of this invention are not limited to the particular details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. For use with a writing machine, apparatus to control it automatically by a record which for such control has a succession of coded recordings some of which are variously representative of writing and other operations to be produced under its control by the writing machine, and some of which are non-representative of operations of said writing machine and are required to be passed idly without effect, said operations of the writing machine consuming varying time intervals for their execution, said apparatus comprising various control solenoids operable to cause said operations of the writing machine, means to read and translate the coded recordings representative of said writing machine operations into output signals to operate said control solenoids variously, and to read and translate the said non-representative recordings into an output signal which is collectively representative thereof, means governed by each record controlled operation of said writing machine to institute each next operation of said reading and translating means in a timed relation to the conclusion of such operation of the writing machine, so that the operations of the latter will be sequenced orderly in accord with the individual time requirements therefor, and means responsive to each said collectively representative output signal, to cause a next operation of said reading and translating means to ensue automatically after a given time interval which is much shorter than most time intervals consumed by the executions of said operations of the said writing machine.

2. For use with a writing machine, apparatus to control it automatically by a record which for such control has a succession of coded recordings some of which are variously representative of writing and other operations to be produced under its control by the writing machine, and some of which are non-representative of operations of said writing machine and are required to be passed without effect, said operations of the writing machine consuming varying time intervals for their execution, said apparatus comprising various control solenoids operable to cause said operations of the writing machine, means to read and translate the coded recordings representative of said writing machine operations into output signals to operate said control solenoids variously, and to read and translate the said non-representative recordings into an output signal which is collectively representative thereof, means governed by each record controlled operation of said writing machine to institute each next operation of said reading and translating means in a timed relation to the conclusion of such operation of the writing machine, so that the operations of the latter will be sequenced orderly in accord with the individual requirements therefor, and means including a cycling device responsive to said collectively representative output signal, to cause a next operation of said reading and translating means to ensue automatically after a time interval controlled by the cycling device which is appreciably shorter than most time intervals consumed by the executions of said operations of the writing machine.

3. The combination with a writing machine having a series of control means, some for effecting character writing operations and some for effecting other than the character writing operations, said operations consuming different time intervals for their execution, of apparatus for automatically operating said machine under control of a record having a succession of coded recordings of which some are variously representative of said operations of said machine and of which some are not so representative, are required to be passed without effect and are thus surplus insofar as control of said machine is concerned, said apparatus comprising, solenoids for operation of said control means, a reading means for successively reading coded recordings of said record, an electromagnetic device, a record advancing means responsive to every operation of said device to advance quickly the record to a new reading position, code translating means on one hand adapted to translate coded recordings representative of said machine operations which are read by said reading means, into selective operations of said control means, and on the other hand adapted to translate any of the said surplus coded recordings read by said reading means, into a transitory operating signal for said electromagnetic device, means adapted to respond to institutions of all said operations of said machine to send a transitory operating signal to said electromagnetic device, and means to render said record reading means and associated translating means effective in response to completions of said machine operations, or with a machine operation standing already completed, directly at the end of any operation of the record advancing means, whereby said record reading and translating means will function promptly at the end of each operation of said record advancing means which follows a sensing of a surplus code, but will function delayedly and variously timed following the conclusions of said operations of said writing machine.

4. The combination with a writing machine having a series of control means, some for effecting character writing operations and some for effecting other than the character writing operations, said operations consuming different time intervals for their execution, of apparatus for automatically operating said machine under control of a record having a succession of coded recordings of which some are variously representative of said operations of said machine and of which some are not so representative, are required to be passed without effect and are thus surplus insofar as control of said machine is concerned, said apparatus comprising, solenoids for operation of said control means, a reading means for successively reading coded recordings of said record, an electromagnetic device, a record advancing means responsive to every operation of said electromagnetic device to advance quickly the record to a new reading position, code translating means on one hand adapted to translate coded recordings representative of said machine operations which are read by said reading means, into selective operations of said control means, and on the other hand adapted to translate any of the said surplus coded recordings read by said reading means, into a circuit closure for said electromagnetic device thereby to effect an operation of the record advancing means, means adapted to respond to institutions of all the said operations of said machine to effect also a circuit closure for said electromagnetic device, means to render said reading and translating means effective in response to completions of said machine operations, or with a machine operation standing completed, directly at the end of any operation of the record advancing means, and means to effect automatically a circuit interruption for said electromagnetic device following each circuit closure therefor, thereby to prepare it for a renewed operation incident to a next record reading operation.

5. The combination with a writing machine having a series of control means, some for effecting character writing operations and some for effecting other than the character writing operations, said operations consuming different time intervals for their execution, of apparatus for automatically operating said machine under control of a record having a succession of coded recordings of which some are variously representative of said operations of said machine and of which some are not so representative, are required to be passed without effect and are thus surplus insofar as control of said machine is concerned, said apparatus comprising, solenoids for operation of said control means, a reading means for successively reading coded recordings of said record, cyclic means adapted to advance the said control record to prepare it for the reading of each succeeding coded recording by said reading means, an electromagnetic device, when operated, causing said cyclic means to effect an advancement of said record, electrical code translating means, on one hand, adapted to translate coded recordings which are read by said reading means and are also representative of said machine operations, into selective operations of said solenoids, and, on the other hand, adapted to translate any of the said surplus coded recordings read by said reading means, into a circuit closure for said electromagnetic device to cause said cyclic means to operate and to render promptly said translating means again effective, means adapted to respond to all said solenoids to effect also a circuit closure for said electromagnetic device to cause said cyclic means to operate, and further adapted to respond to the completion of each of said machine operations to render said translating means transitorily active, and means to open the circuit for said electromagnetic device after it has been closed, and then to prepare it for renewed closure, either by the operations of any of said solenoids or the said translation of any surplus coded recording.

6. The combination with a writing machine having a series of control means, some for effecting character writing operations and some for effecting other than the character writing operations, said operations consuming different time intervals for their execution, of apparatus for automatically operating said machine under control of a record having a succession of coded recordings of which some are variously representative of said operations of said machine and of which some are not so representative, are required to be passed without effect and are thus surplus insofar as control of said machine is concerned, said apparatus comprising, solenoids for operation of said control means, a reading means for successively reading coded recordings of said record, cyclic means adapted to advance the said record to facilitate thereafter the reading of the succeeding coded recording by said reading means, an electromagnetic device, when operated, causing said cyclic means to effect an advancement of said record, code translating means, on one hand, adapted to translate coded recordings which are read by said reading means and are also representative of said machine operations, into selective operations of said solenoids, and, on the other hand, adapted to translate any of the said surplus coded recordings read by said reading means, into a circuit closure for said electromagnetic device for an operation thereof, and means adapted to respond to the institutions of all the said operations of the writing machine to effect a circuit closure of said electromagnetic device, and further adapted to respond to the completion of each of said machine operations to render said translating means effective, said code translating means having associated therewith a power control, governed by said cyclic means, so that it is potentially effective only over a conclusive range of each cycle ending in a starting range, said electric power control permitting thus circuit closures of said electromagnetic device by said translating means, when or after said conclusive range of each cycle is reached, wherefore if any surplus coded recordings follow each other in succession, the circuit for said electromagnetic device will be closed each time before the end of the cycle, causing said cyclic means to operate without an interruption.

7. For use with a typewriting machine having various mechanisms, including type actions, adapted for selective operation and requiring different time itnervals to execute their operations, apparatus to operate said mechanisms automatically under the control of a coded record, comprising in combination, a solenoid for each of said mechanisms to select them individually for operation, signal lines for said solenoids, lesser in number than said solenoids, switching means associated with said signal lines to render each connectable to one or another of two solenoids individually related thereto, means capable of conditioning to one or another state to position oppositely said switching means to connect concomitantly all said signal lines to their one or other related solenoids, two special signal lines related to said state conditioning means, means responsive to signals imparted respectively to said special signal lines to place said state conditioning means in said one or other of its two states, said record being provided with coded recordings individually representative of all of said signal lines and being provided further with some coded recordings which are required to be passed without effect and are of surplus nature insofar as operations of said mechanisms are concerned, means adapted to read and translate the coded recordings representative of said various signal lines into individual electric outputs to these lines, a further signal line, said reading and translating means further adapted to read and translate each of said surplus coded recordings into an electric output to said further signal line, means governed by said mechanisms variously to cause each next operation of said reading and translating means to ensue automatically regulated variously substantially as each such mechanism assumes its restored position, and means responsive to a signal output to either of said two special signal lines and also responsive to any signal output over said further signal line to cause in each instance a next operation of said reading and translating means to ensue after a given time interval which is appreciably shorter than most time intervals consumed by the operations and restorations of said mechanisms.

References Cited in the file of this patent

UNITED STATES PATENTS

| | | |
|---|---|---|
| 2,240,562 | Lake et al. | May 6, 1941 |
| 2,448,842 | Tholstrup | Sept. 7, 1948 |